United States Patent
Uhde (12)

(10) Patent No.: US 10,760,232 B1
(45) Date of Patent: Sep. 1, 2020

(54) DOCK LEG WITH ADJUSTABLE LENGTH AND ANTI-ROTATION MECHANISM

(71) Applicant: Hewitt Machine & MFG., Inc., Nicollet, MN (US)

(72) Inventor: Steve Uhde, Madelia, MN (US)

(73) Assignee: HEWITT MACHINE & MFG., INC., Nicollet, MN (US)

( * ) Notice: Subject to any disclaimer, the term of this patent is extended or adjusted under 35 U.S.C. 154(b) by 0 days.

(21) Appl. No.: 16/717,172

(22) Filed: Dec. 17, 2019

(51) Int. Cl.
*E02B 3/06* (2006.01)
*E02B 3/20* (2006.01)

(52) U.S. Cl.
CPC ............. *E02B 3/20* (2013.01); *E02B 3/068* (2013.01)

(58) Field of Classification Search
CPC ................................. E02B 3/068; E02B 3/20
USPC .................................................. 405/218, 221
See application file for complete search history.

(56) References Cited

U.S. PATENT DOCUMENTS

| | | | | |
|---|---|---|---|---|
| 4,352,597 A | * | 10/1982 | Kay | E02B 3/068 114/263 |
| 4,890,959 A | * | 1/1990 | Robishaw | E01D 21/00 405/204 |
| 6,361,252 B1 | * | 3/2002 | Leitheiser | E02B 3/068 16/33 |
| 8,596,906 B2 | | 12/2013 | Ebbenga et al. | |
| 9,388,545 B1 | * | 7/2016 | Wolner | E02B 3/068 |
| 2009/0095852 A1 | * | 4/2009 | Smith | E02B 3/068 248/158 |

* cited by examiner

*Primary Examiner* — Frederick L Lagman
(74) *Attorney, Agent, or Firm* — Westman, Champlin & Koehler, P.A.

(57) ABSTRACT

An adjustable leg for use with a dock includes a tubular, lower member having a non-circular cross-section when taken normal to a longitudinal axis where the lower member has a first end and a second end. The lower member further includes a plate secured to the first end, the plate having a threaded through bore, and a disc secure to the plate. The disc has an elliptical aperture that is biased from the plate. The adjustable leg includes a tubular, upper member having a non-circular cross-section when taken normal to the longitudinal axis. The upper member is sized to be positioned over the lower member. The upper member further includes a threaded rod rotatably positioned within an interior cavity of the upper member, the threaded rod rotatably secured to the upper member. The threaded rod is configured to threadably engage the threaded bore and wherein the disc is configured engage the threaded rod and to place upward pressure on the threaded rod to prevent or reduce unwanted rotation of the rod.

20 Claims, 7 Drawing Sheets

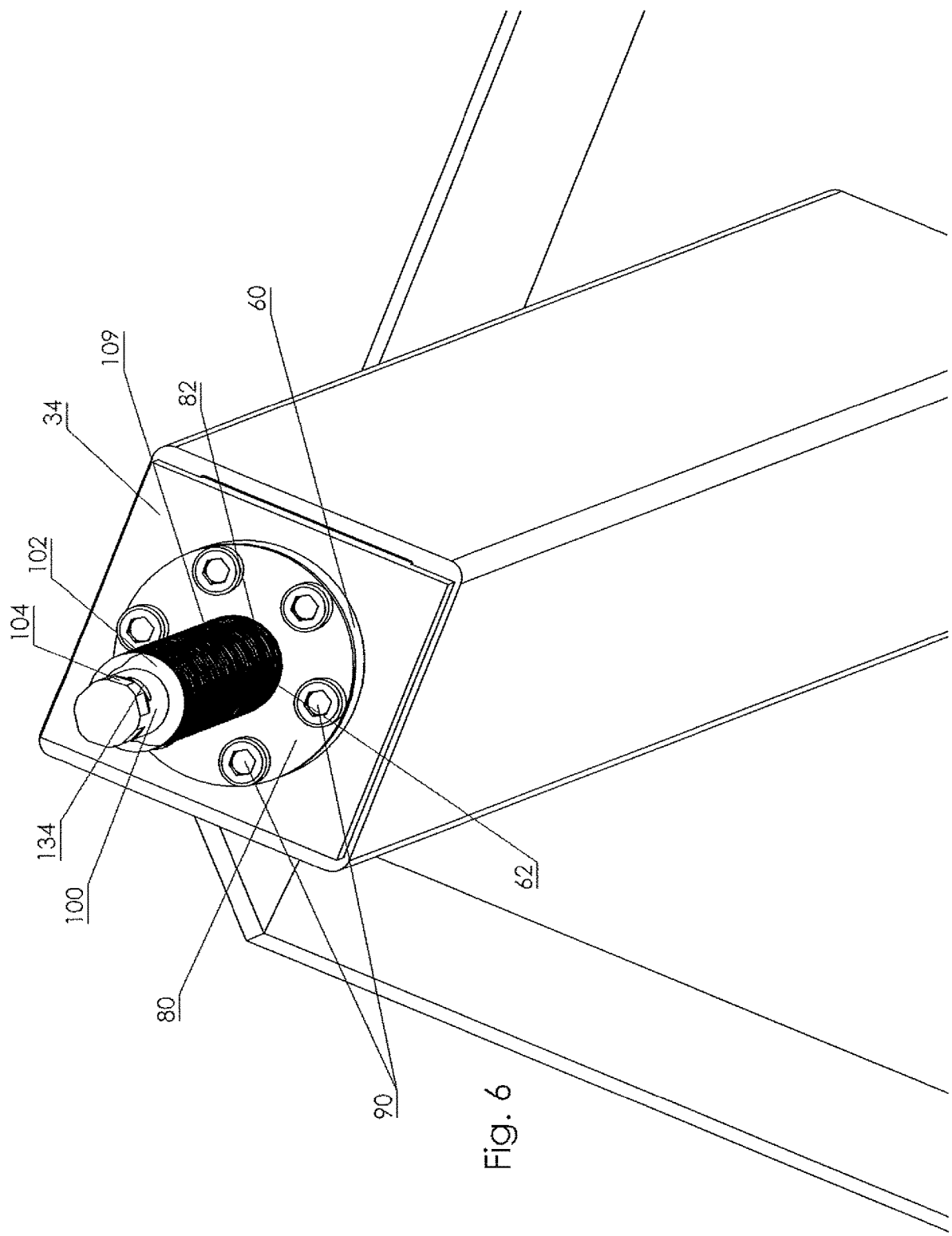

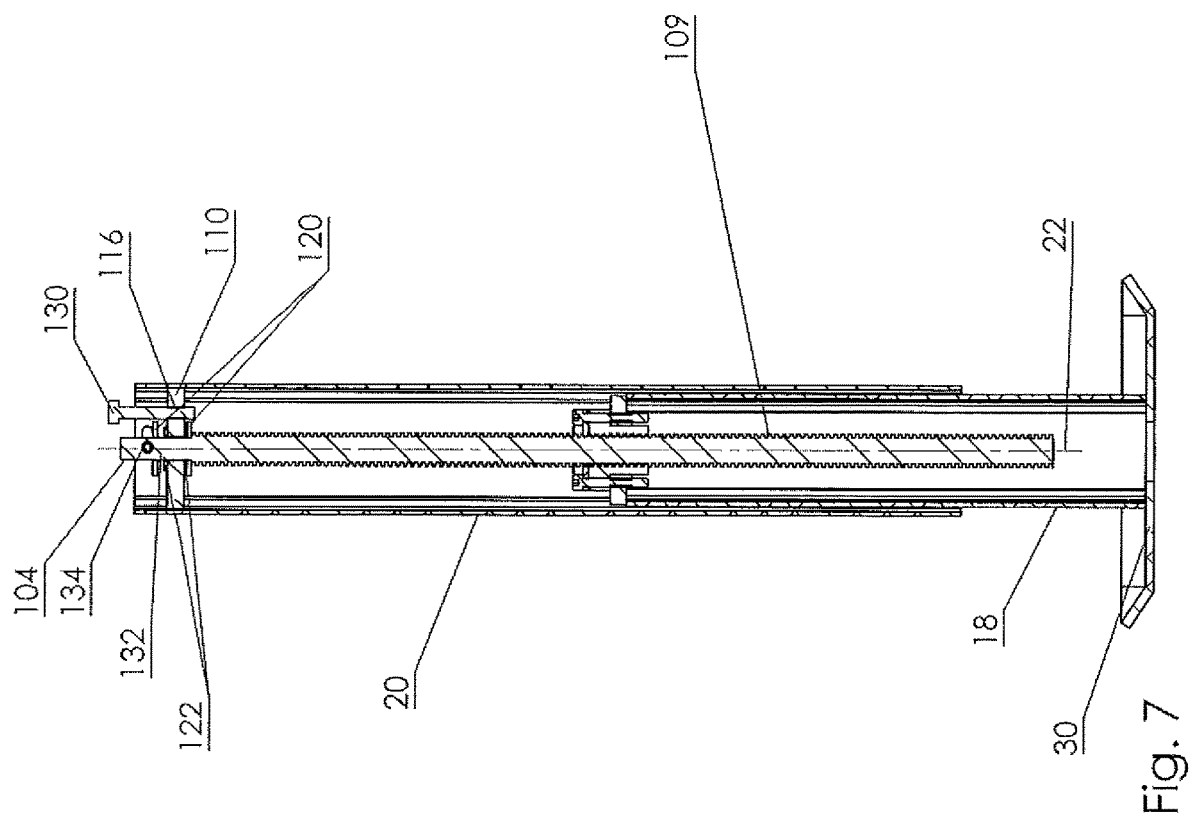

DOCK LEG WITH ADJUSTABLE LENGTH AND ANTI-ROTATION MECHANISM

BACKGROUND

The present disclosure relates to a leg for a dock where a length of the leg can be manipulated and retained at a selected length. More particularly, the present disclosure relates to a leg for a dock where the length is manipulated through rotation of a threaded member and wherein the leg includes one or more anti-rotation mechanisms to retain the leg at the selected length.

A typical adjustable dock leg includes an upper portion and a lower portion where one portion telescopes within the other portion. In some dock legs, one portion is moved relative to the other portion with manual force until apertures align in the two portions, which allow a bolt or a pin to be inserted therethrough to retain the two portions at the selected length. However, increasing the length of the leg may be difficult due to the weight of the dock and attempting to increase or decrease the length of the leg an excessive amount may cause binding between the two portions.

Other configurations of adjustable dock legs include an upper portion with a rotatable threaded rod that engages a fixed member with a threaded bore in a lower portion. Rotation of the threaded rod about an axis of rotation causes the upper portion to move relative to the lower portion, and thereby adjust a length of the leg. Advantageously, the rod may be rotated with a hand tool that provides mechanical advantage or a power tool, such as an electric or battery-operated tool to allow the length of the leg to be easily adjusted. In alternative configurations, a nut is rotatably secured to the upper portion and the rod is fixedly secured to the bottom portion where rotation of the nut adjusts a length of the leg.

However, various forces on the dock legs including, but not limited to, waves, wind, the weight of the dock and combinations thereof can cause unwanted rotation of the threaded rod relative to the fixed member, and therefore reduce the length of one or more legs of the dock. A result of the unwanted rotation of the threaded rod relative to the fixed nut is the unwanted lowering of the dock or the deck of the dock becoming unlevel.

SUMMARY

An aspect of the present disclosure relates to an adjustable leg for use with a dock. The adjustable leg includes a tubular, lower member having a non-circular cross-section when taken normal to a longitudinal axis where the lower member has a first end and a second end. The lower member further includes a plate secured to the first end, the plate having a threaded through bore, and a disc secure to the plate. The disc has an elliptical aperture that is biased from the plate. The adjustable leg includes a tubular, upper member having a non-circular cross-section when taken normal to the longitudinal axis. The upper member is sized to be positioned over the lower member. The upper member further includes a threaded rod rotatably positioned within an interior cavity of the upper member, the threaded rod rotatably secured to the upper member. The threaded rod is configured to threadably engage the threaded bore and wherein the disc is configured engage the threaded rod and to place upward pressure on the threaded rod to prevent or reduce unwanted rotation of the rod.

Another aspect of the present disclosure relates to a dock. The dock includes a structure supporting decking along a length and at least one pair of adjustable legs attached to the structure supporting the decking. Each leg of the at least one pair of legs is configured to raise or lower the dock relative to a water level of a body of water. Each leg includes a tubular, lower member having a non-circular cross-section when taken normal to a longitudinal axis where the lower member has a first end and a second end. The lower member further includes a plate secured to the first end, the plate having a threaded through bore, and a disc secure to the plate. The disc has an elliptical aperture that is biased from the plate. The adjustable leg includes a tubular, upper member having a non-circular cross-section when taken normal to the longitudinal axis. The upper member is sized to be positioned over the lower member. The upper member further includes a threaded rod rotatably positioned within an interior cavity of the upper member, the threaded rod rotatably secured to the upper member. The threaded rod is configured to threadably engage the threaded bore and wherein the disc is configured engage the threaded rod and to place upward pressure on the threaded rod to prevent or reduce unwanted rotation of the rod.

This summary is provided to introduce concepts in simplified form that are further described below in the Detailed Description. This summary is not intended to identify key features or essential features of the disclosed or claimed subject matter and is not intended to describe each disclosed example or every implementation of the disclosed or claimed subject matter. Specifically, features disclosed herein with respect to one example may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative examples.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several examples.

FIG. 6 is perspective view of the locking disc engaging the threaded rod.

FIG. 7 is a sectional view of the leg.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The present disclosure relates to an adjustable leg for a dock or other structure that has a surface for supporting a person above a body of water. The leg has a plurality of members that move relative to each other by rotating a threaded rod in one member and within a fixed member having threaded bore in another member. The threaded engagement of the rod with the fixed member cause a length of the leg to be adjusted. The adjustable leg includes a pressure plate coupled to the fixed member wherein the pressure plate places an upward force on the threaded rod to inhibit unwanted rotation of the rod, where the unwanted rotation causes the length of the leg being shortened. The adjustable leg can optionally include a positive stop which prevents rotation of the rod through contact between the stop and a member extending from the threaded rod.

Figure 1:
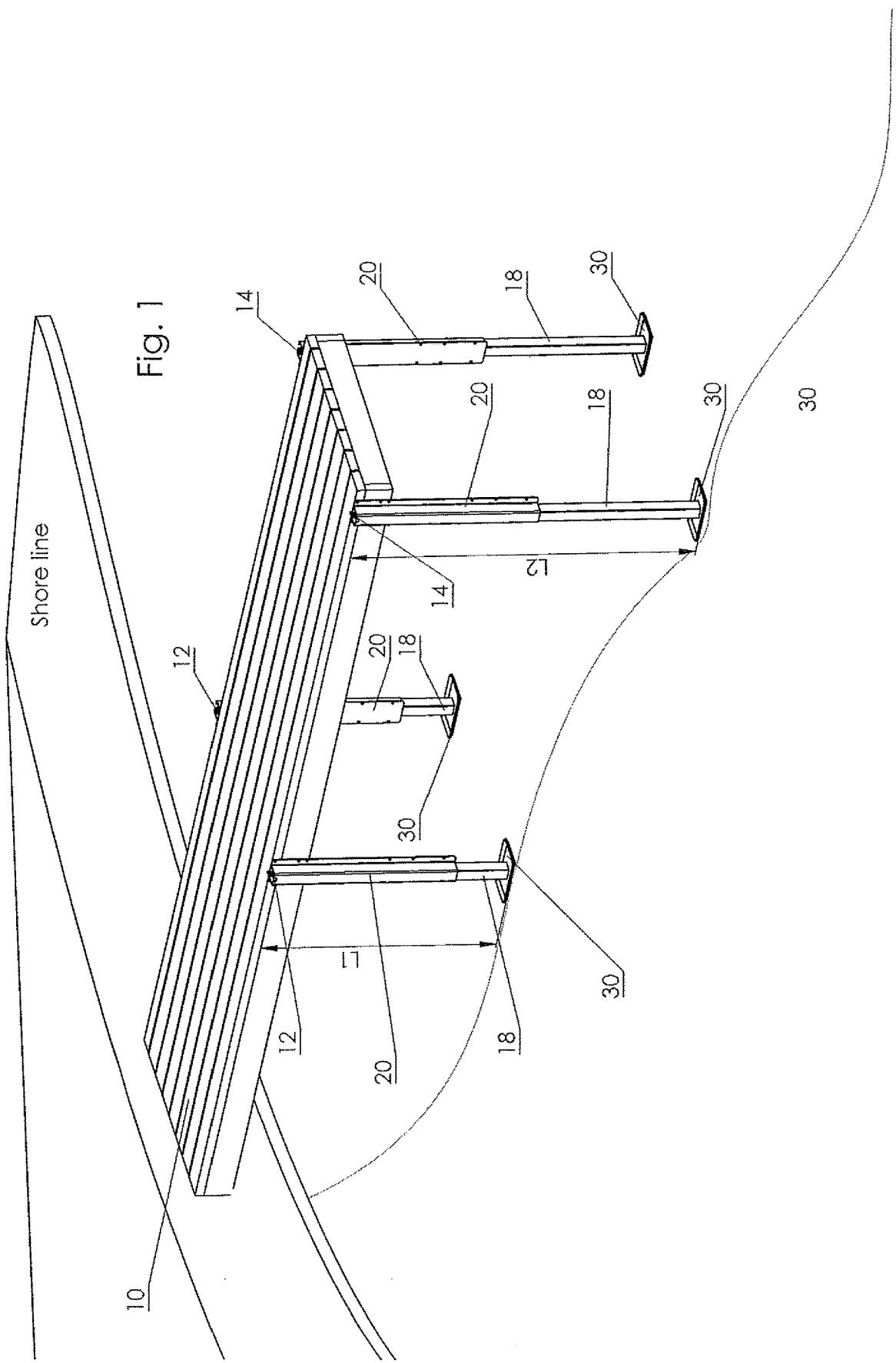
FIG. 1 is a view of a dock with pairs of adjustable legs.

A dock 10 with pairs of adjustable legs 12 and 14 is illustrated in FIG. 1. Each of the legs of the pairs of adjustable leg 12 and 14 are similarly constructed and is attached to a support structure of the dock that retains decking. Each leg 16 has a lower member 18 having a distal end 20 that engages a bed of a body of water and an upper member 20 having an upper end that extends above the surface of the body of water, wherein the lower member 18 telescopes within the upper member 20. As such, the pairs of legs 12 are adjusted to about a same length L1 and the pairs of legs 14 are adjusted to about a same length L2 such that decking 11 on the dock 10 is substantially level and/or at a gradual slope along a length of the dock 10.

Figure 2:
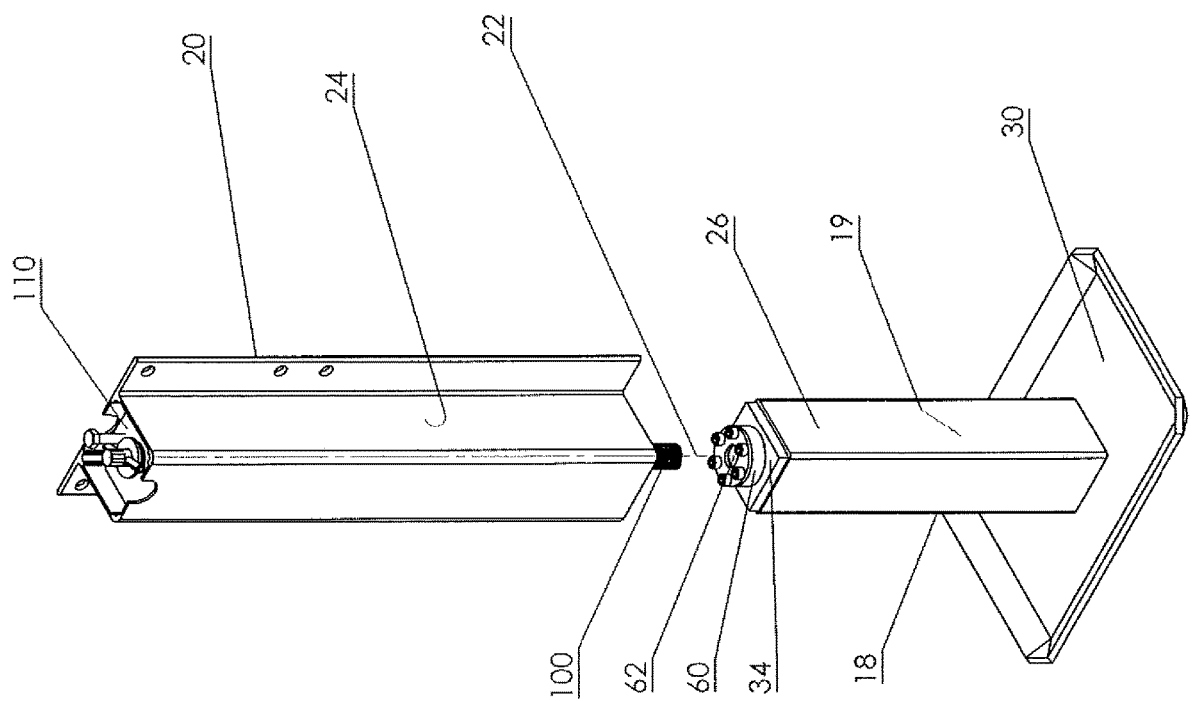
FIG. 2 is an exploded view of an adjustable leg for a dock or other structure.
Figure 3:
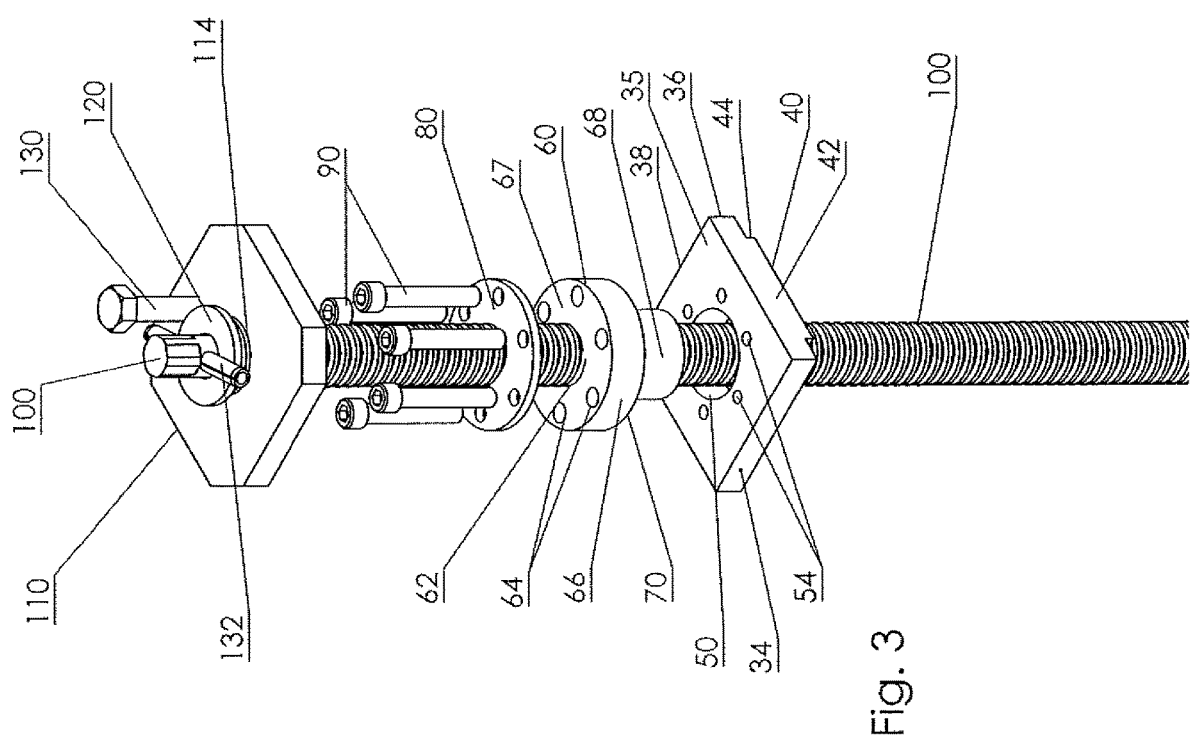
FIG. 3 is a perspective view of internal mechanisms of the leg used to adjust the length thereof.

Referring to FIGS. 2, 3 and 7, the lower member 18 includes a tubular member 24 having a substantially square outer surface 26 taken in a cross section substantially normal to a central axis 22 of the leg 16. In the illustrated embodiment, the tubular member 24 has the outer surface 26 having four substantially flat, sides of the same length connected by rounded corners. However, any non-circular cross-sectional configuration of the tubular member 24 is within the scope of the present disclosure.

The upper member 20 is constructed of a tubular member having an interior cavity 24 with a surface having a substantially square cross-section when taken along the axis 22, wherein the interior cavity 24 is sized to allow the lower member 18 to move or telescope therein. The non-circular cross-sectional configuration of the lower member 18 and the interior cavity 24 of the upper member 20 allows the members 18, 20 to move along the axis 22 relative to each other while preventing rotation of the members 18, 20 relative to each other, which allows the length L1, L2 of the leg 16 to be manipulated.

While the leg 16 is described with the lower member 18 moving within the interior cavity 24 of the upper member 16, the present disclosure also contemplates the upper member 16 moving within an interior cavity of the lower member 18. Further, while a leg 16 constructed of two members is described herein, the leg 16 is not limited to two members, and can include any number of telescoping members as required.

The lower member 18 includes a foot 30 attached proximate a bottom end 32. The foot 32 increases the surface area of the leg 16 engaging the bed of the body of water and aids in preventing the leg 16 from sinking into the bed.

A plate 36 is positioned on a top end 34 of the lower member 18. The plate 34 includes an upper portion 36 having a perimeter 38 that has substantially a same configuration as the outer surface 26 of the lower member 18, so as to not interfere with the movement of the upper member 20 relative the lower member 18 to adjust the length of the leg 16. The plate 34 includes a lower portion 40 extending from the upper portion 38. The lower portion 40 includes a perimeter 42 that is configured to be positioned within an interior cavity 19 of the lower member 18, wherein the perimeter 42 is complimentary with the interior cavity 19 to prevent rotation of the plate 34 relative to the lower member 18.

The plate 34 includes a shoulder 44 defined by the perimeter 42 of the lower portion 40 and a bottom surface of the upper portion 36. The shoulder 44 engages the inner surface of the interior cavity 19 and the top end 34 of the lower member 18. The plate 34 can be attached to the top end 34 of the lower member 18 with a weld, an adhesive, a cement an interference fit or any combination thereof to retain the plate 34 to the lower member 18 and to prevent the plate from rotating relative to the lower member 18.

The plate 34 includes a through bore 50 that extends therethrough. The bore 50 is configured to receive a hub 60 having a threaded bore 62 configured to threadably engage a threaded rod 100 that is rotatably secured to the upper member 20. The plate 34 includes a plurality of uniformly spaced apart threaded apertures 54 that align with spaced apart apertures 64 in an upper portion 66 of the hub 60.

The hub 60 includes a lower portion 68 that extends from the upper portion 66 where the lower portion 68 includes a perimeter configured to be positioned through the through bore 50 of the plate 34. The hub includes a shoulder 70 that engages a top surface 35 of the plate 34 when the lower portion 68 is positioned through the through bore 50.

Referring to FIGS. 3-7, the lower member 18 includes a locking disc 80 that is positioned on a top surface 67 of the upper portion 66 of the hub 60. The locking disc 80 includes an elliptical aperture 82 having a short radius R1 that is sized to engage the threaded rod 100 and long radius R2 that is sized to prevent engagement with the threaded rod 100.

Figure 5:
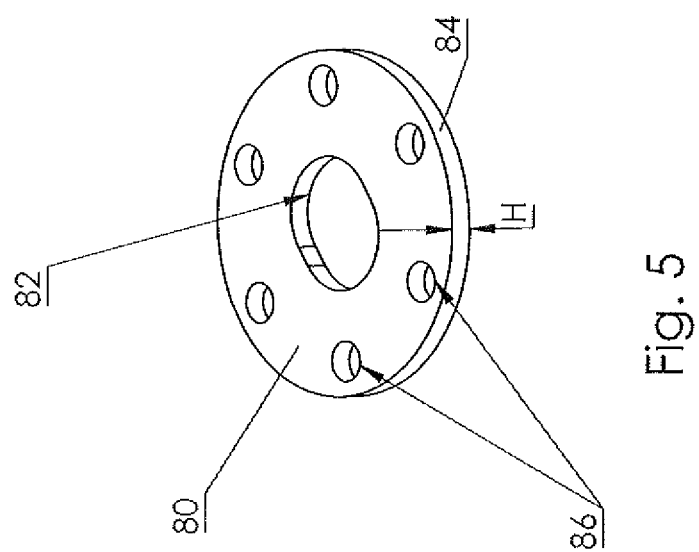
FIG. 5 is a perspective view of the locking disc.
Figure 4:
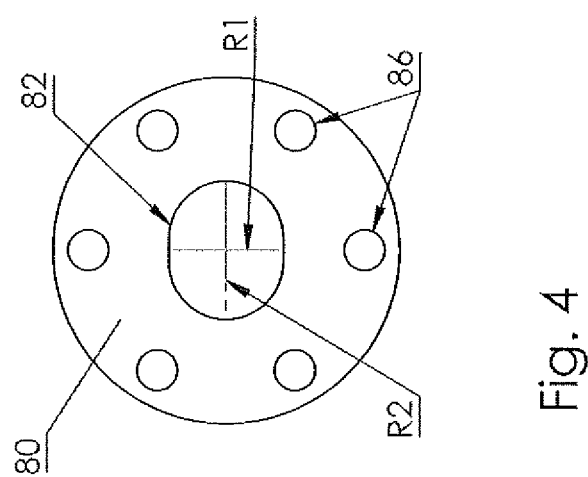
FIG. 4 is a top view of a locking disc.

As illustrated in FIG. 5, in a relaxed state, the locking disc 80 has a frusto-conical configuration where a surface 82 defining the elliptical aperture 82 extends above a perimeter of 84 by a height H. When secured to the hub 60, the locking disc 80 is substantially flat, but is biased to toward the frusto-conical configuration, such that when the threaded rod 100 engages the locking disc 80, an upward force is applied to the threaded rod 100, which aids in preventing unwanted rotation of the rod 100.

The locking disc 80 is secured to the hub 60 by aligning substantially uniformly spaced apertures 86 with the apertures 64 in the hub 60 and with the threaded apertures 54 in the plate 34. Once the apertures 86, 60 and 54 are aligned a threaded bolt 90 is positioned into each aligned set of apertures and is rotated to threadably engage the threaded apertures 54 in the plate 34. The threaded engagement of the bolt 90 with the threaded aperture 54 causes a head 92 on the bolt 90 to engage the locking disc 80 and force the locking disc 80 into a substantially flat configuration on the upper surface of the hub 60. However, the bias of the locking disc 80 places an upward force on the threaded rod 100 when engaged therewith, where the substantially uniform spacing of the bolts 90 maintains a substantially uniform upward force on the threaded rod 100, which prevents binds as the rod 100 is rotated.

The upper member 20 includes a retaining plate 110 located proximate a top end 112 thereof. The retaining plate 110 includes a through bore 114 configured to allow the threaded rod to pass therethrough. The upper member 20 includes an upper washer 120 that engages an upper shoulder 102 of the threaded rod 100 and a lower washer 122 that engages a lower shoulder 104 proximate an upper end 106. The washers 120, 122 engage opposing surfaces of the retaining plate 110 to limit movement along the axis, while allow rotation about the axis. The upper end 104 is configured with flat surfaces 106 and corners 108 that allow the rod 100 to be gripped and rotated by a tool (not shown).

The upper member 20 is secured to the lower member 18 by aligning the threaded portion 109 of the rod 100 with the threaded bore 62 in the hub 60 and rotating the rod 100 to threadably engage the threaded bore 62. As the rod 100 is rotated such that the threaded end 109 is moving toward the bottom end 32 of the lower member 18, the length of the leg 16 is reduced. As the rod 100 is rotated such that the threaded end is moving away from the bottom 32 of the lower member 18, the length of the leg 16 is increased.

While the rod 100 is threadably engaged with the hub 60 the locking disc 80 places an upward force on the rod 100, which minimizes or prevents unwanted rotation and a shortening of the length of the leg 16 due to forces from waves, wind and combinations thereof. However, at times, the force of the waves and or the wind may overcome the upward force of the locking disc 80 on the threaded rod 100.

Figure 8:
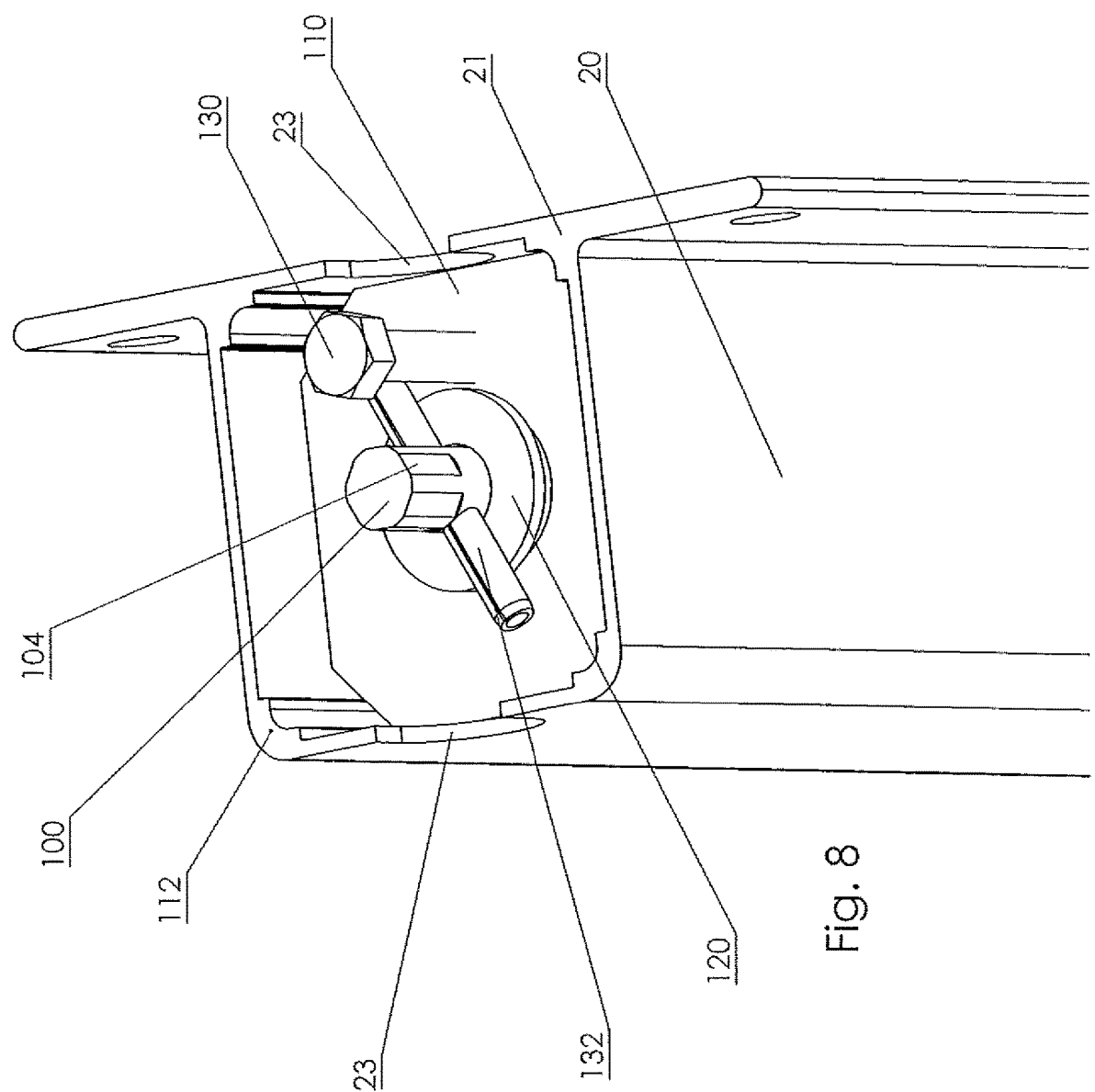
FIG. 8 is a perspective view of an upper member of the leg.

Referring to FIGS. 3 and 7-8, to prevent rotation, a bolt 130 can be inserted into a threaded bore 116 in the retaining plate 110 a distance from the through bore 114 and engage a pin 132 extending from the rod 100. The pin 132 is positioned through a bore 134 in the rod 100 that intersects the axis 22 at a substantially normal configuration. The pin 132 has a sufficient length such that as the threaded rod 100 is rotated about the axis 22, the pin 132 engages the bolt 130 to provide a positive stop that prevents further rotation of the rod 100.

As illustrated, the retaining plate 110 is located a distance from an upper edge 21 of the upper member 20. As such, the upper member 20 includes cut outs 23 on opposing surfaces to provide access to the bore 134 to position the pin 132 therethrough. Further, the upper end 104 of the threaded rod 100 is recessed within the upper member 20, to prevent a person from accidentally contacting the rod 100 and to allow a cap (not shown) to be positioned on the leg 16.

As illustrated and described herein, the stop utilizes a threaded bolt 130 engaging a threaded bore 116. However, the present disclosure is not limited to the bolt engaging the bore. Rather, any type of upwardly extending member can be utilized, such as, but not limited to, a peg extending from a cavity in the plate 110. Further the present disclosure is not limited to a pin 132 secured to the rod 110. Rather, any member extending a distance from the rod 100 that engages the upwardly extending member from plate 110 can be utilized.

As illustrated in FIG. 1, the dock 10 with the pairs of adjustable legs 12 and 14 are illustrated in a body of water. The paris of the adjustable legs 12 and 14 may each be individually adjusted until dock 10 is level or at a desired slope and at a selected height, taking in factors such as, but not limited to the water level of the body of water. The above described adjustable leg 16 may advantageously prevent external forces from changing the height of an adjustable leg 16, thereby maintaining the dock at the selected height.

Although the subject of this disclosure has been described with reference to several examples, workers skilled in the art will recognize that changes may be made in form and detail without departing from the scope of the disclosure. In addition, any feature disclosed with respect to one example may be incorporated in another example, and vice-versa.

The invention claimed is:

1. An adjustable leg for use with a dock, the leg comprising:
a tubular, lower member having a non-circular cross-section when taken normal to a longitudinal axis the lower member having a first end and a second end, the lower member further comprising:
a plate secured to the first end, the plate having a threaded through bore; and
a disc secured to the plate, the disc having an elliptical aperture that is biased from the plate; and
a tubular, upper member having a non-circular cross-section when taken normal to the longitudinal axis, wherein the upper member is sized to be positioned over the lower member, the upper member further comprises:
a threaded rod rotatably positioned within an interior cavity of the upper member, the threaded rod rotatably secured to the upper member, wherein the threaded rod is configured to threadably engage the threaded bore and wherein the disc is configured engage the threaded rod and to place upward pressure on the threaded rod to prevent or reduce unwanted rotation of the rod.

2. The adjustable leg of claim 1, wherein the disc comprises a frusto-conical configuration in a relaxed state.

3. The adjustable leg of claim 2, wherein the disc is substantially flat when secured to the plate and is biased toward the frusto-conical position.

4. The adjustable leg of claim 1, wherein the elliptical aperture of the disc has a short radius configured to engage the threaded rod and place upward pressure thereon and a long radius configured to be disengaged from the threaded rod.

5. The adjustable leg of claim 4, wherein the disc is secured to the plate with a plurality of uniformly spaced attachments such that the disc provides substantially uniform pressure to opposing sides of the threaded rod.

6. The adjustable leg of claim 1, wherein the tubular upper member comprises a top plate that rotatably secures the threaded rod and wherein the top plate comprises an aperture spaced from the threaded rod.

7. The adjustable leg of claim 6, and the tubular upper member further comprises a first rigid member extending from the top plate.

8. The adjustable leg of claim 7, wherein the first rigid member comprises a bolt.

9. The adjustable leg of claim 7, and further comprising a second rigid member extending from the threaded rod, the second rigid member having a length sufficient to engage the first rigid member when the rod is rotated.

10. The adjustable leg of claim 9, wherein the second rigid member comprises a pin.

11. A dock comprising:
a structure supporting decking along a length;
at least one pair of adjustable legs attached to the support structure, the legs configured to raise or lower the dock relative to a water level of a body of water, each leg comprising:
a tubular, lower member having a non-circular cross-section when taken normal to a longitudinal axis the lower member having a first end and a second end, the lower member further comprising:

a plate secured to the first end, the plate having a threaded through bore; and a disc secured to the plate, the disc having an elliptical aperture that is biased from the plate; and a tubular, upper member having a non-circular cross-section when taken normal to the longitudinal axis, wherein the upper member is sized to be positioned over the lower member, the upper member further comprises:

a threaded rod rotatably positioned within an interior cavity of the upper member, the threaded rod rotatably secured to the upper member, wherein the threaded rod is configured to threadably engage the threaded bore and wherein the disc is configured engage the threaded rod and to place upward pressure on the threaded rod to prevent or reduce unwanted rotation of the rod to retain the dock at a selected position.

12. The dock of claim 11, wherein the disc comprises a frusto-conical configuration in a relaxed state.

13. The dock of claim 12, wherein the disc is substantially flat when secured to the plate and is biased toward the frusto-conical position.

14. The dock of claim 11, wherein the elliptical aperture of the disc has a short radius configured to engage the threaded rod and place upward pressure thereon and a long radius configured to be disengaged from the threaded rod.

15. The dock of claim 14, wherein the disc is secured to the plate with a plurality of uniformly spaced attachments such that the disc provides substantially uniform pressure to opposing sides of the threaded rod.

16. The dock of claim 11, wherein the tubular upper member comprises a top plate that rotatably secures the threaded rod and wherein the top plate comprises an aperture spaced from the threaded rod.

17. The dock of claim 16, and the tubular upper member further comprises a first rigid member extending from the top plate.

18. The dock of claim 17, wherein the first rigid member comprises a bolt.

19. The dock of claim 17, and further comprising a second rigid member extending from the threaded rod, the second rigid member having a length sufficient to engage the first rigid member when the rod is rotated.

20. The dock of claim 19, wherein the second rigid member comprises a pin.

* * * * *